United States Patent
Sun et al.

(10) Patent No.: US 10,253,473 B2
(45) Date of Patent: Apr. 9, 2019

(54) ROCK ANCHOR FOUNDATION STRUCTURE SUITABLE FOR MOUNTAIN PHOTOVOLTAIC MODULE AND CONSTRUCTION METHOD OF ROCK ANCHOR FOUNDATION STRUCTURE

(71) Applicant: PowerChina Huadong Engineering Corporation Limited, Hangzhou (CN)

(72) Inventors: Miaojun Sun, Hangzhou (CN); Mingyuan Wang, Hangzhou (CN); Wenbo Du, Hangzhou (CN); Weida Ni, Hangzhou (CN); Xiao Xiong, Hangzhou (CN)

(73) Assignee: PowerChina Huadong Engieering Corporation Limited, Hangzhou (CN)

( * ) Notice: Subject to any disclaimer, the term of this patent is extended or adjusted under 35 U.S.C. 154(b) by 0 days.

(21) Appl. No.: 15/632,289

(22) Filed: Jun. 23, 2017

(65) Prior Publication Data
US 2018/0002885 A1  Jan. 4, 2018

(30) Foreign Application Priority Data

Jul. 4, 2016  (CN) .......................... 2016 1 0516961

(51) Int. Cl.
*E02D 5/80* (2006.01)
*H02S 20/10* (2014.01)
(Continued)

(52) U.S. Cl.
CPC ............... *E02D 5/80* (2013.01); *E02D 27/50* (2013.01); *F16M 11/22* (2013.01); *F24S 25/12* (2018.05); *F24S 25/617* (2018.05); *H02S 20/10* (2014.12); *E02D 5/76* (2013.01); *E02D 2250/0023* (2013.01); *E02D 2300/002* (2013.01); *E02D 2300/0006* (2013.01);
(Continued)

(58) Field of Classification Search
None
See application file for complete search history.

(56) References Cited

U.S. PATENT DOCUMENTS

| 5,125,608 A * | 6/1992 | McMaster ............. F24J 2/5232 126/570 |
| 2004/0136788 A1 * | 7/2004 | Hindle ................ E21D 21/0026 405/259.1 |

(Continued)

*Primary Examiner* — Devina Pillay
(74) *Attorney, Agent, or Firm* — Wayne & Ken, LLC; Tony Horn

(57) ABSTRACT

The present invention relates to a rock anchor foundation structure suitable for a mountain photovoltaic module and a construction method of the rock anchor foundation structure. A technical solution of the present invention is as follows: the rock anchor foundation structure comprises a drill hole drilled in a rock slope, an anchor rod module arranged in the drill hole and a photovoltaic power station module. The photovoltaic power station module is connected with the anchor rod module through a hollow connecting steel pipe; the photovoltaic power station module comprises a bracket welded on the top of the hollow connecting steel pipe, a beam mutually hinged with the top of the bracket and a photovoltaic cell panel arranged at the upper part of the beam. The rock anchor foundation structure of the present invention is suitable for the technical fields of around treatment and foundation engineering design.

2 Claims, 2 Drawing Sheets

(51) Int. Cl.
 *E02D 27/50* (2006.01)
 *F16M 11/22* (2006.01)
 *F24S 25/12* (2018.01)
 *F24S 25/617* (2018.01)
 *E21D 21/00* (2006.01)
 *F16B 13/14* (2006.01)
 *E02D 5/76* (2006.01)

(52) U.S. Cl.
 CPC .... *E02D 2300/0029* (2013.01); *E21D 21/008* (2013.01); *E21D 21/0026* (2013.01); *F16B 13/141* (2013.01)

(56) References Cited

U.S. PATENT DOCUMENTS

2012/0251262 A1* 10/2012 Hidalgo Salgado .. F16B 13/066 411/15
2015/0034145 A1* 2/2015 Fujimura ................. E04B 2/88 136/251

* cited by examiner

ROCK ANCHOR FOUNDATION STRUCTURE SUITABLE FOR MOUNTAIN PHOTOVOLTAIC MODULE AND CONSTRUCTION METHOD OF ROCK ANCHOR FOUNDATION STRUCTURE

FIELD OF THE INVENTION

The present invention belongs to the technical fields of ground treatment and foundation engineering design and particularly relates to a rock anchor foundation structure suitable for a mountain photovoltaic module and a construction method of the rock anchor foundation structure.

BACKGROUND OF THE INVENTION

A photovoltaic cell panel is a device for converting solar energy into electric energy and is a core member of a photovoltaic power station. Photovoltaic power station foundation engineering is to transfer loads of the photovoltaic cell panel and a bracket thereof into a structure in a stratum. A foundation form of current ground photovoltaic power stations may be mainly categorized into a screw pile foundation, an independent foundation, a strip foundation and an anchor rod foundation, and photovoltaic brackets adopt rock anchor (rod) foundations mostly in mountainous and hilly lands due to the characteristics of burying depth of rock formations, large topographic relief and the like. In the rock anchor foundation, by connecting a photovoltaic panel bracket with an anchor rod and bonding the anchor rod to the rock formation through an adhesive material, the loads of the panel and the bracket are transferred into the stratum finally. At present, in the rock anchor foundations of the photovoltaic power stations, the anchor rods mostly adopt threaded steel and manganese silicon steel mostly. However, most of construction regions of the mountain photovoltaic power stations are three-no-environments without roads, power and water; and with adoption of ordinary threaded steel and manganese silicon steel as anchor bar materials of the anchor rod foundations, a great deal of electric welding cutting work needs to be carried out necessarily, large-power diesel generators certainly will be equipped in the site construction, and corresponding construction difficulty and the building cost are increased in mountain area construction.

A hollow anchor rod, serving as an anchor bar, has been popularized in fields of transmission towers and building engineering, but is still not popularized in a small-sized rock anchor foundation of the photovoltaic power station. Rods of the hollow anchor rod have been standardized, may be produced in a large scale, and may be arbitrarily combined through connecting joints when being used, thereby meeting the length required in the site. The hollow anchor rod may utilize a middle inner hole of the rod as a grouting and exhausting passage, so that the plumpness of a grouting body is guaranteed. Meanwhile, the hollow anchor rod may be vertically, horizontally or obliquely mounted and is very strong in adaptability and simple in construction process.

SUMMARY OF THE INVENTION

Technical problems to be solved by the present invention are as follows: a rock anchor foundation structure suitable for the mountain photovoltaic module and a construction method of the rock anchor foundation structure are provided for solving the problems of low construction efficiency and higher construction cost in the existing photovoltaic power station foundation and improving the capability of the foundation of bearing the load at the same time.

The present invention adopts the following technical solution: the rock anchor foundation structure suitable for the mountain photovoltaic module comprises a drill hole drilled in a rock slope, an anchor rod module arranged in the drill hole and a photovoltaic power station module, wherein the photovoltaic power station module is connected with the anchor rod module through a hollow connecting steel pipe; the anchor rod module comprises a hollow anchor rod inserted into the drill hole and provided with continuous waveform threads on the surface, a plastic anchor head module, a stop-grouting plug, a steel cushion plate and a fastening nut; the plastic anchor head module, the stop-grouting plug, the steel cushion plate and the fastening nut are used with the hollow anchor rod; a mortar anchorage body is filled between the hollow anchor rod and the drill hole for fixing; and the photovoltaic power station module comprises a bracket welded on the top of the hollow connecting steel pipe, a beam mutually hinged with the top of the bracket and a photovoltaic cell panel arranged at the upper part of the beam.

The plastic anchor head module is fixed at the hollow anchor rod at the hole bottom of the drill hole, the hollow anchor rod is sleeved with the stop-grouting plug below the orifice of the drill hole and is fastened by the steel cushion plate and the fastening nut on the surface of the orifice, and the top of the hollow anchor rod is exposed to the rock slope.

A gravel layer is filled in the gap between the plastic anchor head module and the drill hole.

A concrete protective bearing platform is poured by taking the hollow anchor rod as the center and the top surface of the bearing platform is slightly higher than the top surface of the fastening nut.

The construction method of the rock anchor foundation structure suitable for the mountain photovoltaic module comprises the following steps:

1. drilling the drill hole in the rock slope by adopting a hydraulic mountain drilling rig, and introducing air into the drill hole by using an air compressor, and repeatedly cleaning the drill hole;

2. after cleaning the drill hole, rapidly inserting the hollow anchor rod provided with the plastic anchor head module into the drill hole, throwing the gravel layer with coarser particles of the thickness of 15 cm in a gap between the bottom of the drill hole and the plastic anchor head module, cleaning away oil stains on the outer wall of the hollow anchor rod at the same time, enabling a placing angle of the hollow anchor rod to keep consistent with an inclined angle of the drill hole, and enabling the hollow anchor rod to be always in the central position of the drill hole after the hollow anchor rod is placed;

3. levelling the rock slope at the orifice of the drill hole, sleeving the stop-grouting plug on the hollow anchor rod below the orifice, sleeving the steel cushion plate and the fastening nut in the hollow anchor rod close to the surface of the orifice, and tightly screwing the fastening nut;

4. mixing the mortar anchorage body according to a design ratio, connecting a grouting connector with the top of the hollow anchor rod, continuously pouring the mortar anchorage body in a gap between the drill hole and the hollow anchor rod through a pneumatic grouting pump, and tightly screwing the fastening nut again after the mortar anchorage body is dried and caked;

5. building a wooden template on the levelled surface of the rock slope at the orifice of the drill hole, pouring concrete in the template, repeatedly vibrating the concrete, pouring the concrete until the concrete surface is higher than the top surface of the fastening nut by 1 cm to form a concrete protective bearing platform, and burying and curing the concrete protective bearing platform by sands after initial setting of the concrete; and 6. tightly screwing the hollow connecting steel pipe and the exposed hollow anchor rod, welding the top of the hollow connecting steel pipe with the bracket, hinging the bracket with the beam, and arranging the photovoltaic cell panel on the beam.

The present invention has the beneficial effects that: the hollow anchor rod and a grouting technology which are suitable for various terrains are adopted, and the concrete protective bearing platform is utilized to protect a rock anchor system, so that the construction efficiency of the mountain photovoltaic power station foundation is improved, the construction cost is lowered, and the capability of the foundation of bearing the loads (loads of the photovoltaic panel and the bracket) is improved at the same time.

DETAILED DESCRIPTION OF THE INVENTION

Figure 1:
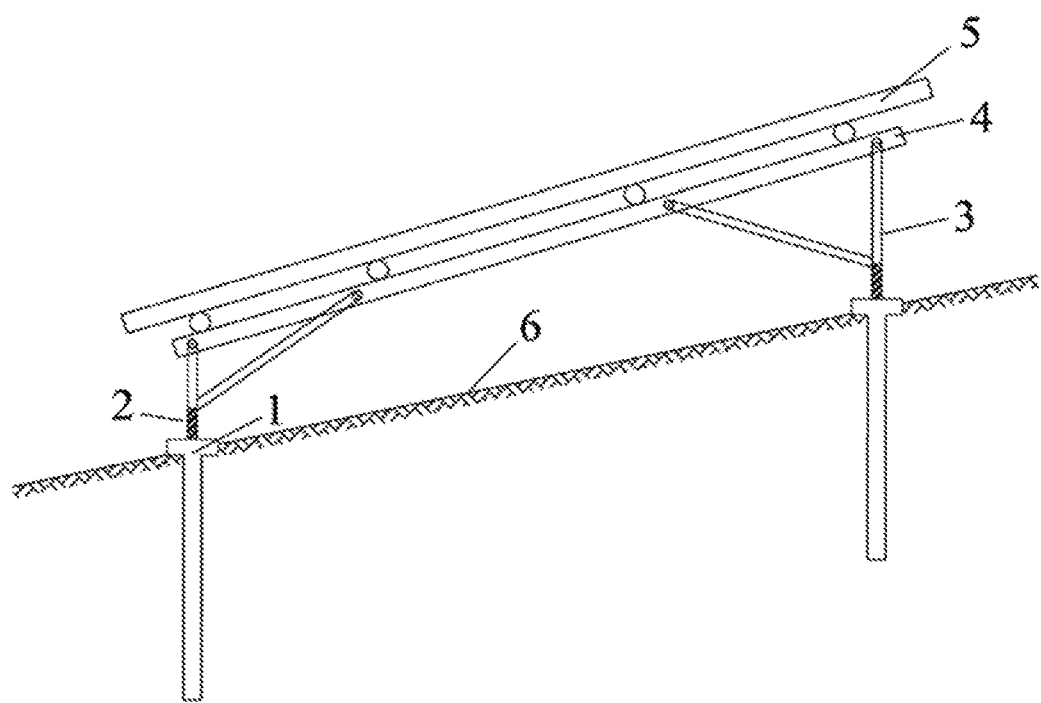
FIG. 1 is a connection schematic diagram of a mountain photovoltaic module bracket and a rock anchor foundation in the present invention.
Figure 2:
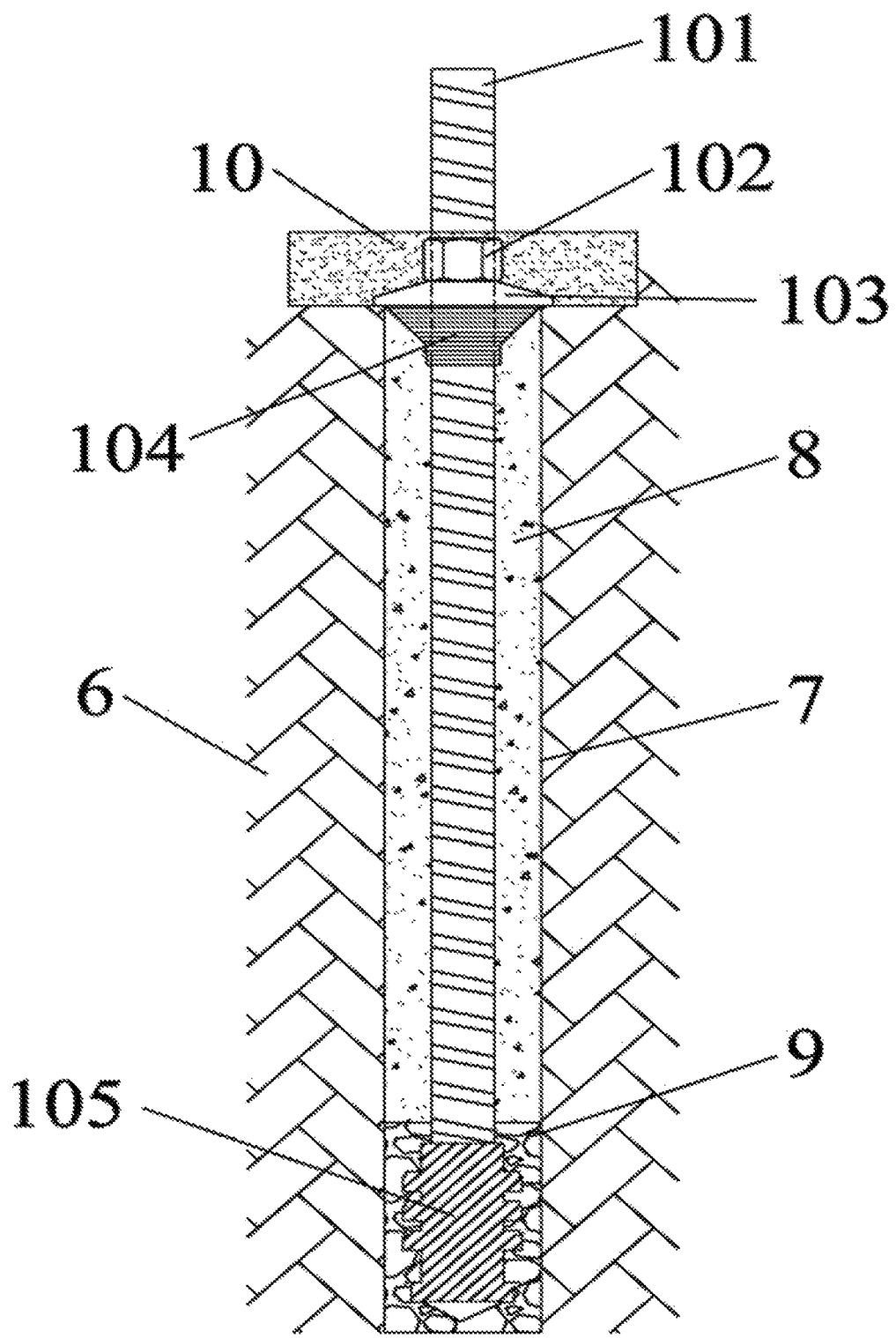
FIG. 2 is a structural schematic diagram of a rock anchor foundation in the present invention.

As shown in FIG. 1 and FIG. 2, the present embodiment is a rock anchor foundation structure suitable for a mountain photovoltaic module. The rock anchor foundation structure comprises a drill hole 7 drilled in a rock slope 6, an anchor rod module 1 arranged in the drill hole, a photovoltaic power station module and a hollow connecting steel pipe 2 used for connecting the photovoltaic power station module with the anchor rod module 1.

The photovoltaic power station module comprises a beam 4, a bracket 3 hinged to the lower side of the beam 4 and a photovoltaic cell panel 5 arranged at the upper part of the beam, and the bottom of the bracket 3 is welded with the hollow connecting steel pipe 2.

The anchor rod module 1 comprises a hollow anchor rod 101 inserted into the drill hole 7 and provided with continuous waveform threads on the surface, a plastic anchor head module 105, a stop-grouting plug 104, a steel cushion plate 103 and a fastening nut 102, and the plastic anchor head module 105, the stop-grouting plug 104, the steel cushion plate 103 and the fastening nut 102 are used with the hollow anchor rod 101.

The top of the hollow anchor rod 101 is exposed to the rock slope 6 and is in threaded connection with the hollow connecting steel pipe 2. A mortar anchorage body 8 is filled between the hollow anchor rod (which is a hollow rod piece with a middle inner hole as a grouting and exhausting passage) and the drill hole 7 for fixing the hollow anchor rod 101; and a gravel layer 9 with the thickness of 15 cm is filled in the plastic anchor head module 105 at the bottom of the mortar anchorage body 8, i.e., a gap between the plastic anchor head module 105 and the drill hole 7, so as to ensure that the hollow anchor rod 101 is always in the central position of the drill hole 7. The stop-grouting plug 104 is arranged below the orifice of the drill hole 7, the steel cushion plate 103 and the fastening nut 102 are sequentially sleeved into the hollow anchor rod 101 close to the surface of the orifice, the fastening nut 102 is tightly screwed to mutually wedge the steel cushion plate 103 with the rock slope 6 and the fastening nut 102 tightly; the concrete protective bearing platform 10 is poured by taking the hollow anchor rod 101 as the center; the bottom surface of the concrete protective bearing platform 10 is mutually wedged with the levelled surface of the rock slope 6; the top surface of the concrete protective bearing platform 10 is higher than the top surface of the fastening nut 102 by about 1 cm; an elevation of the bottom of the steel cushion plate 103 and the bottom surface of the concrete protective bearing platform 10 is consistent with an elevation of the orifice of the drill hole 7; and the mortar anchorage body 8 is a mixture of cement, medium-coarse sands and clear water.

A specific implementation method of the present embodiment comprises the following steps:

1. drill the drill hole 7 in the rock slope 6 by adopting a hydraulic mountain drilling rig according to the aperture, the length and the accuracy required by design, and after drilling is finished, introducing air into the drill hole 7 by using an air compressor, and repeatedly cleaning the drill hole 7 to ensure that the hole wall of the drill hole 7 is clean;

2. after cleaning the drill hole, rapidly inserting the hollow anchor rod 101 provided with the plastic anchor head module 105 into the drill hole 7, throwing the gravel layer 9 with coarser particles of the thickness of about 15 cm in a gap between the bottom of the drill hole 7 and the plastic anchor head module 105, cleaning away oil stains on the outer wall of the hollow anchor rod 101 at the same time, enabling the placing angle of the hollow anchor rod 101 to keep consistent with the inclined angle of the drill hole 7, and enabling the hollow anchor rod 101 to be always in the central position of the drill hole 7 after the hollow anchor rod 101 is placed;

3. levelling the rock slope 6 at the orifice of the drill hole 7, enabling the stop-grouting plug 104 to be below the orifice, sequentially sleeving the steel cushion plate 103 and the fastening nut 102 in the hollow anchor rod 101 on the top of the stop-grouting plug 104, i.e. the surface of the orifice, and tightly screwing the fastening nut 102 to mutually wedge the steel cushion plate 103 with the rock slope 6 and the fastening nut 102;

4. mixing the mortar anchorage body 8 according to a design ratio, connecting a grouting joint with the top of the hollow anchor rod 101, continuously pouring the mortar anchorage body 8 in interval gap between the drill hole 7 and the hollow anchor rod 101 through a pneumatic grouting pump, and tightly screwing the fastening nut 102 again after the mortar anchorage body 8 is dried and caked, wherein the mortar anchorage body 8 is the mixture of cement, the medium-coarse sands and the clear water;

5. building a wooden template on the levelled surface of the rock slope 6 at the orifice of the drill hole 7, pouring concrete in the template, repeatedly vibrating the concrete, pouring the concrete until the concrete surface is higher than the top surface of the fastening nut 102 by about 1 cm to form a concrete protective bearing platform 10, and burying and curing the concrete protective bearing platform 10 by sands after initial setting of the concrete; and 6. tightly screwing the hollow connecting steel pipe 2 and the exposed hollow anchor rod 101, welding the top of the hollow connecting steel pipe 2 with the bracket 3, mutually hinging the upper side of the bracket to the beam 4, and arranging the photovoltaic cell panel 5 on the beam.

What is claimed is:

1. A rock anchor foundation structure suitable for a mountain photovoltaic module, comprising:
 a drill hole drilled in a rock slope, an anchor rod module arranged in the drill hole and a photovoltaic power station module;
 wherein the photovoltaic power station module is connected with the anchor rod module through a hollow connecting steel pipe; the anchor rod module comprises a hollow anchor rod inserted into the drill hole and provided with continuous waveform threads on a surface of the hollow anchor rod, a plastic anchor head module, a stop-grouting plug, a steel cushion plate and a fastening nut; the plastic anchor head module, the stop-grouting plug, the steel cushion plate and the fastening nut and the hollow anchor rod are used as a set; a mortar anchorage body (8) is filled between the hollow anchor rod and the drill hole for fixing; and the photovoltaic power station module comprises a bracket welded on the top of the hollow connecting steel pipe, a beam hinged with the top of the bracket and a photovoltaic cell panel arranged at an upper part of the beam;
 the plastic anchor head module is fixed with the hollow anchor rod at a hole bottom of the drill hole;
 the hollow anchor rod is sleeved with the stop-grouting plug below an orifice of the drill hole and is fastened by the steel cushion plate and the fastening nut on a surface of the orifice;
 the top of the hollow anchor rod is exposed to the rock slope;
 a concrete protective bearing platform is poured by taking the hollow anchor rod as a center; and
 a top surface of the bearing platform is higher than a top surface of the fastening nut.

2. A construction method of the rock anchor foundation structure suitable for the mountain photovoltaic module of claim 1, comprising:
 drilling the drill hole in rock slope by adopting a hydraulic mountain drilling rig, introducing air into the drill hole using an air compressor, and repeatedly cleaning the drill hole;
 after cleaning the drill hole, rapidly inserting the hollow anchor rod provided with the plastic anchor head module into the drill hole, throwing a gravel layer with coarser particles of a thickness of 15 cm in a gap between the bottom of the drill hole and the plastic anchor head module, cleaning away oil stains on an outer wall of the hollow anchor rod, enabling a placing angle of the hollow anchor rod to keep consistent with an inclined angle of the drill hole, and enabling the hollow anchor rod to be in a central position of the drill hole;
 levelling a surface of the rock slope at the orifice of the drill hole, sleeving the stop-grouting plug in the hollow anchor rod below the orifice, sleeving the steel cushion plate and the fastening nut in the hollow anchor rod close to the surface of the orifice, and tightly screwing the fastening nut;
 making the mortar anchorage body according to a design ratio, connecting a grouting joint with the top of the hollow anchor rod, continuously pouring the mortar anchorage body in a gap between the drill hole and the hollow anchor rod through a pneumatic grouting pump, and tightly screwing the fastening nut after the mortar anchorage body is dried and caked;
 building a wooden template on the levelled surface of the rock slope at the orifice of the drill hole, pouring concrete in the wooden template, repeatedly vibrating the concrete, pouring the concrete until the concrete surface is higher than the top surface of the fastening nut by 1 cm to form the concrete protective bearing platform, and burying and curing the concrete protective bearing platform by sands after initial setting of the concrete; and
 tightly screwing the hollow connecting steel pipe to the exposed top of the hollow anchor rod, welding the top of the hollow connecting steel pipe with the bottom of the bracket, hinging the top of the bracket with the beam, and arranging the photovoltaic cell panel on the beam.

* * * * *